United States Patent
Widera et al.

(10) Patent No.: US 7,657,621 B2
(45) Date of Patent: Feb. 2, 2010

(54) METHOD FOR THE OUTPUT OF STATUS DATA

(75) Inventors: Ralf Widera, Griesheim (DE); Cornelius Heidemann, Darmstadt (DE); Joachim Mende, Griesheim (DE); Heinrich Doerken, Darmstadt (DE)

(73) Assignee: Deutsche Telekom AG, Bonn (DE)

( * ) Notice: Subject to any disclaimer, the term of this patent is extended or adjusted under 35 U.S.C. 154(b) by 132 days.

(21) Appl. No.: 10/507,228

(22) PCT Filed: Feb. 21, 2003

(86) PCT No.: PCT/DE03/00539

§ 371 (c)(1),
(2), (4) Date: Mar. 7, 2005

(87) PCT Pub. No.: WO03/084135

PCT Pub. Date: Oct. 9, 2003

(65) Prior Publication Data

US 2005/0146525 A1     Jul. 7, 2005

(30) Foreign Application Priority Data

Mar. 12, 2002   (DE)   ............................ 102 10 707

(51) Int. Cl.
*G06F 15/173*   (2006.01)
*G06F 11/00*   (2006.01)

(52) U.S. Cl. .................. 709/224; 370/235; 370/252
(58) Field of Classification Search .................. None
See application file for complete search history.

(56) References Cited

U.S. PATENT DOCUMENTS

| | | | | |
|---|---|---|---|---|
| 6,459,682 | B1 * | 10/2002 | Ellesson et al. ............. | 370/235 |
| 6,578,077 | B1 * | 6/2003 | Rakoshitz et al. ........... | 709/224 |
| 6,614,763 | B1 * | 9/2003 | Kikuchi et al. .............. | 370/252 |
| 2003/0126256 | A1 * | 7/2003 | Cruickshank et al. ....... | 709/224 |
| 2004/0024550 | A1 | 2/2004 | Doerken et al. .............. | 702/79 |
| 2004/0044753 | A1 * | 3/2004 | Toyoshima et al. ......... | 709/223 |

FOREIGN PATENT DOCUMENTS

| | | |
|---|---|---|
| DE | 10046240 | 3/2002 |
| DE | 10128927 | 1/2003 |

* cited by examiner

*Primary Examiner*—Wen-Tai Lin
(74) *Attorney, Agent, or Firm*—Darby and Darby

(57) ABSTRACT

A method for automatically indicating status information of a measuring system via an output device includes assigning status information to respective status ranges according to at least one predetermined condition, the status ranges being limited by at least one threshold value. The status ranges are individually outputted. The status information is automatically updated at a predetermined time interval.

30 Claims, 4 Drawing Sheets

| Measuring computer 28 ==> Measuring computer 30 | | | |
|---|---|---|---|
| | OWD (ms) | IPDV (ms) | PL (%) |
| Best Effort | 2.6 | 0.3 | 0 |
| TC 1 | 2.6 | 0.3 | 0 |
| TC 2 | 2.3 | 0.3 | 6.25 |
| Low Loss | 2.3 | 0.3 | 0 |
| Best Effort | 2.3 | 0.3 | 0 |
| TC 1 | 2.6 | 0.3 | 0 |
| TC 2 | 2.3 | 0.3 | 0 |
| Low Loss | 2.3 | 0.3 | 0 |
| Best Effort | 2.3 | 0.3 | 6.25 |

58  60  62  64

METHOD FOR THE OUTPUT OF STATUS DATA

CROSS-REFERENCE TO RELATED APPLICATIONS

This application is a U.S. National Stage Application under 35 U.S.C. 371 of PCT International Application No. PCT/DE2003/00539, filed Feb. 21, 2003, which claims priority to German Patent Application No. DE 102 10 707.6, filed Mar. 12, 2002.

The present invention relates to a method for outputting status data of a measuring system in a telecommunications network, the status data including the status of components in the measuring system, connections in the measuring system, and/or measurement results of the measuring system.

BACKGROUND

A contract between a network operator and customers may offer the customer guaranteed characteristics in the telecommunications network, such as an upper limit for the packet delay and IP delay variations, which is particularly important for IP telephony and video conferencing.

Consequently, quality characteristics are guaranteed in the telecommunications network, which are made up of the unidirectional packet delay and the parameters derivable therefrom. Thus, the intention is to guarantee the customer maximum values for one or more of these parameters in the telecommunications network, for example, packet delays, IP delay variations and packet losses and/or minimum values for the throughput.

Moreover, compliance with these values must be verifiable the network operator and the customer.

Therefore, unidirectional measurement connections are established between measuring computers. On these measurement connections, measurement packets are sent from a measuring computer serving as a sender to a measuring computer serving as a receiver with a configurable distribution in time. The measurement packets contain, inter alia, time stamps and sequence numbers. To be able to measure the one-way delay, the time stamps at the measuring computer serving as a sender and the measuring computer serving as a receiver must be time-synchronized with sufficient accuracy. A technical implementation is, for example, the generation of time stamps via the GPS (Global Positioning System) receivers. This allows the time stamps to be generated with an error of $\pm \frac{1}{2}$ µs.

The measurement results are retrieved from the measuring computers by a control computer controlling the measuring computers and stored in a database, where they are made available for visualization. The customer and the service provider need to get a prompt overview of the status of the measurement connections and of the measuring system. In this context, "prompt" means that a change in the status of the measurement connections or of the measuring system is indicated as quickly as possible. In particular, when using a plurality of measuring computers, which may also be assigned to different control computers, a large amount of information—status data—is generated. The problem here is that, due to the large amount of information, one loses track of important messages that would possibly require measures to ensure transmission quality.

SUMMARY OF THE INVENTION

It is an object of the present invention to provide a method for outputting status data including at least at least one of a status of a component of a measuring system, a status of a connection of the measuring system, and a measurement result of the measuring system, in such a manner that an overview of the overall situation is made available in a simple manner, even for a large amount of status data, while avoiding the above-mentioned disadvantages.

The present invention provides a method for automatically indicating status information via an output device, the status information including at least one of a status of a component of a measuring system, a status of a connection of the measuring system, and a measurement result of the measuring system. The method includes:

assigning first status information to a first status range of a plurality of fixed status ranges according to at least one first predetermined condition, the first status range being limited by at least one first threshold value;

outputting the assigned first status range; and automatically updating the first status information at a predetermined time interval.

The present invention includes the discovery that the number of pieces of information can be reduced and weighted in a simple manner by assigning status data to certain ranges according to predetermined conditions. The user is only informed of the status range, and thus of the quality level, the status data was assigned to. This then allows the user to draw conclusions, for example, for the measures to be taken to ensure the transmission quality in a telecommunications network.

Therefore, according to the present invention, the status data is at least partially assigned to fixed status ranges according to predetermined conditions, and the respective assigned status ranges are individually output, thus allowing easy identification of the status range the status data was assigned to. Preferably, the status ranges may be limited by at least one threshold value so that when this threshold value is exceeded, the status data is assigned to a different status range.

To prepare the status data for the user in as simple a manner as possible, the output device displays the status data in a graphic along with the assigned status range. This graphic can take the form of a matrix.

According to one embodiment of the present invention, the graphic is implemented in the form of a graphical user interface, for example, using a windows technique; at least individual status ranges of the graphical user interface having further, underlying representation levels which are made visible by activation in the status range lying thereabove.

These graphical user interfaces (GUI) are now widely used as a man-machine interface in computer applications. The graphical user interfaces simplify working with a computer system because they eliminate the need to enter complex textual commands to execute programs. Instead, intuitive graphical symbols (Icons), which correspond to the commands mentioned, are provided on a display screen, i.e., the output device, of the computer system.

Also part of this graphical user interface is a pointing element, which is used in the graphical user interface with the aid of a mouse, trackball, or keyboard. In a graphical user interface, the pointing element, which is generally represented as a pointer, is positioned on an object on the desktop to initiate an action. An object may be, for example, the icon of a program, or an element of the above-mentioned window. The positioning of the pointer above the object may already be an event that causes the computer system to perform a specific action, such as popping up a menu, or displaying information intended to help a user.

This method of displaying information is also referred to as "tooltip". Tooltips are, in particular, small help windows explaining the buttons of the graphical user interface, or providing further information about the status data and/or status ranges.

In the further representation levels of the graphical user interface, which may take the form of underlying windows or tooltips, the status data and/or the status ranges assigned to the status data are displayed in an increasingly detailed manner.

To simplify the identification of the important information, the individual status ranges are individualized by giving them different colors.

In addition, preferably, the ranges reflecting, in particular, the magnitude of a measurement result, several measurement results and/or the values describing a status of a component of the measuring system, together form a hierarchy.

According to one embodiment of the present invention, the measuring system has at least two measuring computers and a control computer controlling the measuring computers. Here, the status data is based on the status of the measuring computers, the quality of the measurement connection between the measuring computers, the reachability of the measuring computers by the control computer, the time synchronization of the measuring computers and/or the currentness of the status data.

In this connection, when the representation is in the form of a matrix, the first column of the matrix displays status data relating to the status of the individual measuring computers; each field of the first column of the matrix being assigned to a measuring computer.

In particular, each measuring computer is represented in its field in the first column by its identifier—name, IP address, or similar.

The status data that belongs to a field of the first column of the matrix and is based on the status of the respective measuring computer is made up of the status of the time synchronization of the measuring computer, the reachability of the measuring computer by the control computer, and error messages of the measuring system regarding this measuring computer.

In this connection, the individual assignments of a measuring computer to a control computer are each shown in the first row of the matrix; each field of the first row of the matrix showing an assignment to a measuring computer.

The matrix fields arranged in row two and the following as well as in column two and the following each indicate the status of the measurement connections between the individual measuring computers, for the purpose of which the measuring computers are arranged in the first column from top to bottom in a predetermined order, and, in the first row, the assignment of the measuring computers is arranged in the same order from left to right in terms of their assignment to a control computer.

Preferably, one of these fields of the matrix in each case indicates a measurement connection or several measurement connections of a measuring computer to another measuring computer in one direction, and the corresponding field symmetrical to the diagonal of the matrix indicates the reverse direction of the measurement connection or connections.

The status of the respective measurement connection is made up of the assignment of the measurement results regarding the quality of the measurement connection to status ranges, of the time synchronization of the measuring computers and/or the currentness of the measurement results.

The matrix fields arranged in row two and the following as well as in column two and the following each have a second representation level in which the status of the measurement connection is shown in more detail.

In particular, the further representation level indicates the type of the measurement connection as well as the status of the individual measurement parameters determining the quality of the measurement connection between the respective measuring computers. Here, the status of the measurement parameters can be made up of the transmission characteristics in the measurement connection, such as the packet delay, IP delay variations, packet losses, or the like.

Moreover, the second representation level may have a subordinate third representation level in which the measurement results are shown in detail over a predetermined period of time. The fields of the first row and column of the matrix may be provided with a subordinate second representation level in which the system messages are displayed.

The measurement results are retrieved from the measuring computers by the control computer and stored in a database, where they are made available for visualization. Offline display of the measuring results and other status data is via a browser. In this context, "offline" means that the display of the measurement results and other status data must be initiated manually while in the case of online visualization, this is done automatically at certain time intervals.

BRIEF DESCRIPTION OF THE DRAWINGS

Further advantages, features and possible uses of the present invention for outputting status data will become apparent from the following description in conjunction with the exemplary embodiments shown in the drawings.

FIG. 3 shows a further representation level of the status matrix of FIG. 2; and

DETAILED DESCRIPTION

Figure 1:
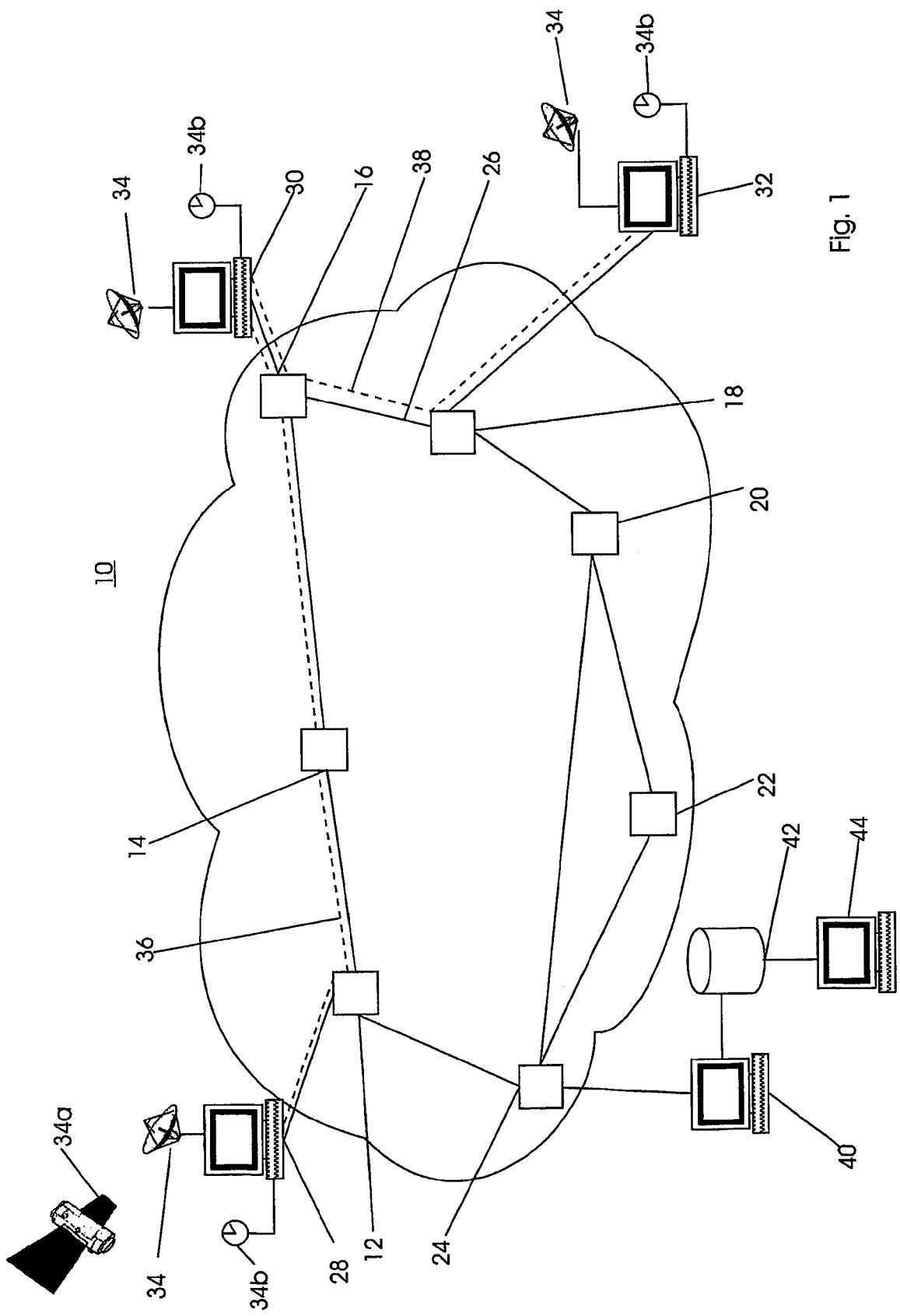
FIG. 1 is a schematic representation of a telecommunications network including a three measuring computers for carrying out the method according to the present invention.

FIG. 1 schematically shows a telecommunications network 10 including a plurality of switching devices 12 through 24 interconnected via trunk lines 26. Switching device 12 is assigned to a first measuring computer 28, switching device 16 is assigned to a second measuring computer 30, and switching device 18 is assigned to a third measuring computer 32. A measurement program for measuring the unidirectional transmission characteristics is installed in each measuring computer 28, 30, 32.

Each measuring computer 28, 30, 32 is connected to a GPS antenna (Global Positioning System) and provided with a GPS map for processing the data received via the GPS antenna. The GPS antenna and the GPS map together form GPS unit 34, which interacts with a plurality of satellites 34a.

The connection between first measuring computer 28, switching device 12, switching device 14, switching device 16, and second measuring computer 30 forms first measurement path 36 shown in dashed lines. The connection between second measuring computer 30, switching device 16, switching device 18, and third measuring computer 32 forms second measurement path 38, which is also shown in dashed lines.

Switching device 24 is assigned a control computer 40. Control computer 40 interacts with a database 42, to which is connected an output device in the form of an output computer 44 having a display screen.

Telecommunications network 10 is, for example, the Internet or an intranet.

The goal of the measurement system is, for example, to determine the packet delay from first measuring computer 28 via measurement path 36 to second measuring computer 30. Thus, the measurement connection is a unidirectional measurement connection, where separate measurement packets are sent from first measuring computer 28 to second measuring computer 30.

On measurement path 36, measurement packets are sent from first measuring computer 28 to second measuring computer 30 with an adjustable distribution in time (for example, a constant or exponential distribution). In the process, the measurement packets are dispatched using the User Datagram Protocol (UDP). This is a connectionless Internet transport protocol based on IP. The measurement packets contain, inter alia, time stamps and sequence numbers.

To allow the unidirectional delay to be measured with sufficient accuracy, the time stamps are generated, for example, by GPS unit 34. This allows the time stamps to be generated with an error of ±½ µs. Here, first measuring computer 28 sets the time stamp shortly (as shortly as possible) before the first bit of the measurement packet is sent.

The measurement packet is sent to second measuring computer 30 via measurement path 36, i.e. via trunk line 26, switching exchange 12, switching exchange 14, and switching exchange 16. When the last bit of the measurement packet is received at second measuring computer 30, the second time stamp is recorded. The second time stamp is generated by second measuring computer 30, for example, also by a GPS unit 34.

Then, the packet delay is calculated from the time stamps taking into account a computer-related time slice; and this value is transmitted to control computer 40 as a measurement result and stored in database 42. The results are continuously displayed online via output computer 44. The measurement packets sent via measurement path 36 can also be used to determine the IP delay variations as well as packet losses, and the like. This data is then stored in database 42 accordingly.

Based on these values, the quality of measurement path 36, i.e., the connection between first measuring computer 28 and second measuring computer 30, can be determined and monitored. The same method can also be used on measurement path 38, and also for further measurement paths not shown here. In this manner, a large amount of data is generated and stored in database 42.

The above-mentioned measurement results—status data—are retrieved from measuring computers 28, 30 and 32 by control computer 40 and stored in database 40, where they are made available for visualization.

Output computer 44 has a graphical configuration interface as well as a graphical user interface for online and offline operation; the interfaces being used to visualize the status data stored in database 42.

The graphical user interface is used, in particular, for output and processing of the status data.

Figure 2:
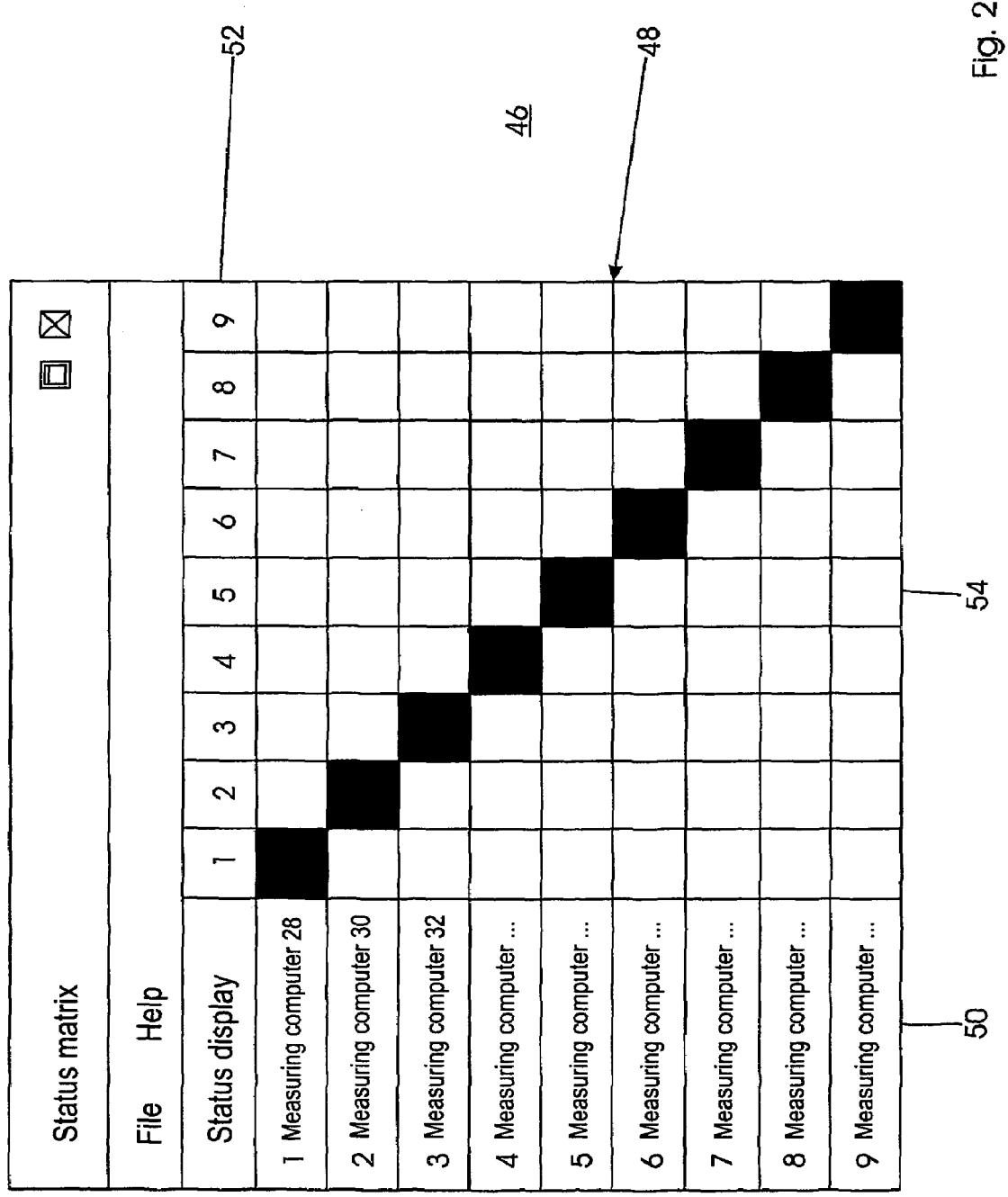
FIG. 2 schematically shows the graphical user interface in a first representation level in the form of a status matrix.

FIG. 2 shows a graphical user interface 46 for displaying the status data stored in database 42 via output computer 44.

In its first representation level, graphical user interface 46 has a status matrix 48 shown in FIG. 2. Located in a further representation level under status matrix 48 are, first of all, a detailed status display and, secondly, a system message display.

The status data is assigned to fixed status ranges according to predetermined conditions. These respective assigned status ranges are individually shown marked in color, thus allowing easy identification of the status ranges the status data was assigned to, and of the quality requirements that are met.

For example, the status of the components of the measuring system shown in FIG. 1 and of the measurement connections is visualized for the user by the colors gray, green, yellow, and red. The colors used have the meaning shown in Table 1.

TABLE 1

| Color | Meaning | Possible cause |
| --- | --- | --- |
| Gray | Nothing to observe | |
| Green | Everything OK | |
| Yellow | Alert situation | For example, a level 1 threshold value for a measurement connection was exceeded |
| Red | Alarm situation | For example, a level 2 threshold value for a measurement connection was exceeded, or a system component is no longer available. |

The colors may also be associated with an audible output, if desired.

The uppermost level of graphical user interface 46 is made up of status matrix 48 shown in FIG. 2. Here, the status of the components of the measuring system shown in FIG. 1 and of the measurement connections over measurement paths 36 and 38 is displayed. The display is updated at intervals of about one minute. Status matrix 48 is divided into several subregions. In first column 50, the fields arranged below each other are numbered serially from top to bottom, and measuring computers 28, 30, 32 are listed. In the following, it is assumed that there are nine measuring computers. The IP addresses or the names of the measuring computers are displayed next to the continuous numbers so that the user can easily associate the field in column 50 with the corresponding measuring computer 28, 30, 32. The current status of measuring computers 28, 30, 32 is visualized by the color in the fields of first column 50. In this context, the status of measuring computers 28, 30, 32 is influenced by three things:

a) the display of the status of the time synchronization of measuring computer 28, 30, 32;

b) the display of the reachability of measuring computer 28, 30, 32 by control computer 40;

c) the display of whether there exist system messages of the status "error" or "alerts" generated by measuring computers 28, 30, 32.

In first column 50, in each case the color representing the worst status is displayed.

In this connection, the following cases are distinguished:

TABLE 2

| Color | Display text | Meaning |
| --- | --- | --- |
| Green | Synchronized (GPS, highly accurate) | The measuring computer is synchronized using a GPS unit (synchronization error <1 µs). |
| | Synchronized (NTP, accurate) | The measuring computer has no GPS unit. Synchronization is via NTP (synchronization error <1 ms). |

TABLE 2-continued

| Color | Display text | Meaning |
|---|---|---|
| Yellow | Synchronized (NTP, accurate) | The measuring computer does have a GPS unit, but obviously, GPS synchronization is currently not possible. Possible causes: Antenna/antenna feeder defective, antenna has no visual contact with at least 4 satellites of the GPS. Synchronization is via NTP (synchronization error <1 ms). Switchover to NTP synchronization occurs automatically. |
|  | Synchronized (NTP, inaccurate) | Synchronization is via NTP (synchronization error <2 ms). No information whether a GPS unit is present. |
| Red | Not synchronized | The measuring computer is not synchronized. The measuring computer has no GPS unit, and synchronization via NTP is not configured. |
|  | Not synchronized (GPS) | The measuring computer is not synchronized. The measuring computer has a GPS unit. Obviously, GPS synchronization is currently not possible. Synchronization via NTP is not configured. |
|  | Not synchronized (NTP) | The measuring computer is not synchronized. The measuring computer has no GPS unit. Synchronization via NTP is configured, but obviously currently not possible or not accurate enough (NTP synchronization may take several hours until the synchronization error is <2 ms). |
|  | Not synchronized (GPS, NTP) | The measuring computer is not synchronized. The measuring computer has a GPS unit. Obviously, GPS synchronization is currently not possible. Synchronization via NTP is configured, but obviously currently not possible or not accurate enough (NTP synchronization may take several hours until the synchronization error is <2 ms). |

The display text shown in column 2 in Table 2 is stored as a tooltip in the respective field of first column 50 of status matrix 48, and is therefore displayed when the pointing element is positioned and left on a field in column 50 of status matrix 48.

Thus, the color selection corresponds to status ranges with regard to the time synchronization of measuring computers 28, 30 and 32.

As mentioned above, time synchronization may be done using GPS unit 34. Alternatively, it is also possible to perform time synchronization via NTP (Network Time Protocol). In the process, local clock 34*b* is synchronized.

Time synchronization via GPS unit 34 is more accurate than via NTP. Consequently, the type of time synchronization is included as status data for the assignment of the measuring computer to a status range.

The reachability of measuring computer 28, 30, 32 by control computer 40 enters into the evaluation as further status data for the assignment of a measuring computer to a status range.

TABLE 3

| Color | Display text | Meaning |
|---|---|---|
| Green | (No specific text) | The last contact between the measuring computer and the control computer was less than 5 minutes ago. |
| Red | Not reachable | There has been no contact with the measuring computer for at least 5 minutes. Possible causes: The connection to the measuring computer was interrupted, or the measuring computer did not start up, or is no longer running. |

The text in column 2 in Table 3 is also stored as a tooltip, and a corresponding display text is displayed when the pointing element is positioned and left in first column 50 of status matrix 48.

Furthermore, the status data included for the assignment of the status of measuring computers 28, 30, 32 to predetermined status ranges correspondingly marked in color also includes system messages of measuring computers 28, 30, 32.

TABLE 4

| Color | Display text | Meaning |
|---|---|---|
| Green | (No specific text) | No unacknowledged errors or alerts present. |
| Yellow | (No specific text) | There is at least one unacknowledged alert (but no error). |
| Red | (No specific text) | There is at least one unacknowledged error. |

In first row 52 of status matrix 48, the fields are assigned to measuring computers 28, 30, 32; the left-to-right order corresponding to the top-to-bottom order in first column 50 with regard to measuring computers 28, 30, 32. The fields of first row 52 display the assignment of the respective measuring computer 28, 30, 32 to control computer 40, of which also a plurality of control computers 40 may be present in telecommunications network 10.

This assignment, too, is assigned to a status range marked in color. This status range is influenced by the following status data:

a) the assignment of the respective measuring computer 28, 30, 32 to an operational control computer 40;

b) the display of the reachability of measuring computers 28, 30, 32 by control computer 40;

c) the display of whether there exist system messages of the status "error" or "alerts" generated by control computer 40.

In first row 52, in each case the color representing the worst status is displayed.

In the context of the assignment of measuring computers 28, 30, 32 to a control computer 40, the following status data is taken as a basis for the respective status ranges marked in color.

TABLE 5

| Color | Display text | Meaning |
| --- | --- | --- |
| Red | Invalid or not defined | This measuring computer was not assigned to a control computer. |
| Green | (No specific text) | This measuring computer is assigned to a control computer. |

The text in column 2 of Table 5 is stored as a tooltip, and a corresponding display text is displayed when the pointing element is positioned and left in the field of first row 52 of status matrix 48.

In the context of the reachability of measuring computers 28, 30 and 32 by control computer 40, the following status data is taken as a basis for the respective status ranges marked in color.

TABLE 6

| Color | Display text | Meaning |
| --- | --- | --- |
| Red | Not reachable | The last status update was at least 5 minutes ago. |
| Green | Reachable | The control computer updated the status less than 5 minutes ago. |

The text in the second column of Table 6 is stored as a tooltip, and a corresponding display text is displayed when the pointing element is positioned and left in the field of first row 52 of status matrix 48.

In the context of the system messages of measuring computers 28, 30, 32 and control computer 40, the following status data is taken as a basis for the respective status ranges marked in color:

TABLE 7

| Color | Display text | Meaning |
| --- | --- | --- |
| Green | (No specific text) | No unacknowledged errors or alerts present. |
| Yellow | (No specific text) | There is at least one unacknowledged alert (but no error). |

TABLE 7-continued

| Color | Display text | Meaning |
| --- | --- | --- |
| Red | (No specific text) | There is at least one unacknowledged error. |

The remaining region of status matrix 48, i.e., rows 2 through 10 and columns 2 through 10, form the third region 54 of status matrix 48. In this region 54, the status of the measurement connections between measuring computers 28, 30, 32 is displayed. The status of the measurement connections is influenced by the following status data:

a) whether so-called "threshold values" are defined;

b) whether these threshold values are currently met;

c) whether measurement packets were received in the last time interval taken as a basis for threshold value monitoring;

d) whether the two measuring computers 28, 30, 32 communicating with each other are sufficiently time-synchronized;

e) whether the two measuring computers 28, 30, 32 communicating with each other are reachable by control computer 40.

Each field of this third region identifies the respective measurement connection(s) from one measuring computer 28, 30, 32 to the other measuring computer 28, 30, 32 in one direction, i.e., unidirectionally. The opposite direction is shown in the respective field of third region 54 symmetrical to the diagonal (represented in black).

In third region 54, in each case the color representing the worst status is displayed. In the context of the definition of threshold values, the following status data is taken as a basis for the respective status ranges marked in color. In this connection, in principle, different levels are conceivable for the threshold values. In the following, only two levels are entered, namely a pre-alert value—level 1—and an alarm value—level 2—. The threshold values may be defined independently of each other for each traffic class and each measurement parameter, such as propagation delay, IP delay variations, and packet loss.

TABLE 8

| Color | Meaning |
| --- | --- |
| Gray | No threshold value was defined for either of the measurement connections between these measuring computers. |
| Same as Tables 9 and 10 | For at least one of the measurement connections, at least one threshold value was defined at least for one measurement parameter. |

In the context of threshold value monitoring, the following status data is taken as a basis for the respective status ranges marked in color:

TABLE 9

| Color | Meaning |
| --- | --- |
| Green | No threshold value was exceeded for either of the measurement connections between these measuring computers. |
| Yellow | For at least one of the measurement connections between these measuring |

TABLE 9-continued

| Color | Meaning |
| --- | --- |
| Red | computers, at least one level 1 threshold value was exceeded, but no level 2 threshold value. At least one level 2 threshold value was exceeded for at least one of the measurement connections between these measuring computers. |

In the context of the reception of measurement packets in the time interval, the following status data is taken as a basis for the respective status ranges marked in color:

TABLE 10

| Color | Meaning |
| --- | --- |
| Green | In the last time interval, at least one measurement packet was received for all measurement connections between the two measuring computers. |
| Red | For at least one of the measurement connections between the two measuring computers, no measurement packet was received in the last time interval. |

In the context of the time synchronization of the measuring computers, the following status data is taken as a basis for the respective status ranges marked in color:

TABLE 11

| Color | Meaning |
| --- | --- |
| Green | Both measuring computers were synchronized with sufficient accuracy. |
| Red | At least one of the two measuring computers was not sufficiently time-synchronized so that the timing values are invalid. Only the packet loss is measured correctly because it is not affected by the time synchronization. |

Each field of third region 54 has an underlying further representation level providing a detailed status display. The status display indicates the status of the individual measurement connections between two measuring computers 28, 30; a distinction being made according to the direction of transmission. The detailed status display can be activated by 1. positioning and leaving the pointing element on a field in third region 54 of status matrix 58—the detailed status matrix is thus stored using the tooltip technique—, or 2. positioning the pointing element on a field of third region 54 of status matrix 48, and clicking on the field with the left key of a mouse.

In the first case, the display remains visible for a few seconds, and in the second case, it remains permanently visible until the display is actively closed by clicking the top right box containing the "X".

Detailed status display 56 is shown in FIG. 3 and includes four columns. In first column 58 of detailed status display 56, the type of the measurement connection is visualized:

"Standard connection": dark gray

"Expert connection": light gray

Expert connections are special connections, which are used only to a limited extent, for example, to locate errors in the network. They can be set up in a special input mode during the configuration of the measuring system, and allow a larger range of values for some configuration parameters as, for example, shorter packet spacings.

Second, third and fourth columns 60, 62 and 64 of detailed status display 56 show the status for the individual measurement parameters of each measurement connection between two measuring computers. There are three entries for each measurement connection:

a) one-way delay in ms: OWD—second column 60;

b) IP delay variation in absolute values in ms: IPDV—third column 62;

c) packet loss in %: PL—fourth column 64.

The status of the individual measurement parameters is influenced by three things:

a) the definition of threshold values and threshold value monitoring;

b) the reception of measurement packets in a predetermined time interval;

c) the time synchronization of the two measuring computers 28, 30, 32.

In each case the color representing the worst status is displayed.

In the context of the definition of threshold values and threshold value monitoring, the following status data is taken as a basis for the respective status ranges marked in color:

TABLE 12

| Color | Meaning |
| --- | --- |
| Gray | For this measurement parameter, no threshold values were entered in the database. The connection is an "expert" connection, where the measurement results for each measurement packet are stored in the database (so-called "raw data mode"). Due to the potentially very large data volume, there is no threshold value monitoring for this type of measurement connections. |
| Green | No threshold value was exceeded for this parameter. |
| Yellow | The level 1 threshold value was exceeded for this parameter. |
| Red | The level 2 threshold value was exceeded for this parameter. |

In the context of the reception of measurement packets in a predetermined time interval, the following status data is taken as a basis for the respective status ranges marked in color.

TABLE 13

| Color | Meaning |
| --- | --- |
| Green | In the last time interval, at least one measurement packet was received for this measurement connection. |
| Red | In the last time interval, no measurement packet was received for this measurement connection. In this case, the value 0 is displayed for the individual measurement parameters, respectively. |

In the context of the time synchronization of the two measuring computers 28, 30, 32, the following status data is taken as a basis for the respective status ranges marked in color:

TABLE 14

| Color | Meaning |
|---|---|
| Green | Both measuring computers were synchronized with sufficient accuracy. |
| Red | At least one of the two measuring computers was not sufficiently time-synchronized so that the timing values are invalid. In this case, "-" is displayed for OWD and IPDV, respectively, and the correct value is displayed for PL (not affected by the time synchronization). |

Figure 4:
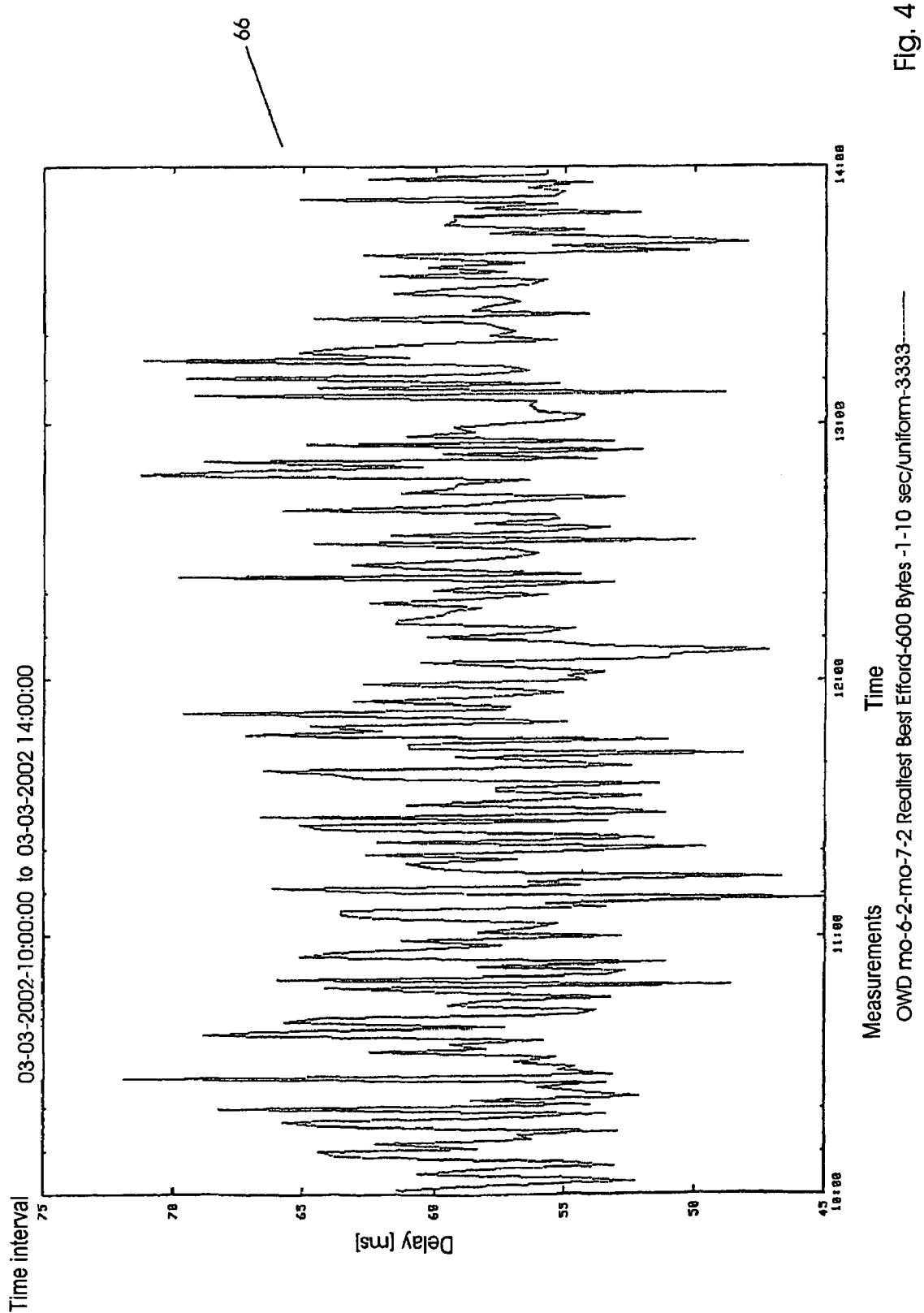
FIG. 4 schematically shows a graphic of measurement results over a measurement connection.

Second, third and fourth columns 60, 62 and 64 of detailed status display 56 have an underlying further representation level. When the pointing element is positioned in one of the fields of second, third and fourth columns 60, 62 and 64 of detailed status display 56 and, in this field, a measured value is clicked with the left key of a mouse in this field, then the measurement results are graphically represented in a new window for the selected measurement connection. As soon as a new measurement result is stored for this measurement connection in the database, this graphic 66 is updated. An example of such a graphic 66 is shown in FIG. 4.

The fields in first column 50 of status matrix 48 and the fields in first row 52 also have an underlying further representation level. This further representation level displays the system messages. The system message display is activated when the pointing element is positioned on the field of a measuring computer in first column 50 of status matrix 48, or in a field of first row 52 of status matrix 48, and the respective field is clicked with the left mouse button. The system messages are displayed in a list. Errors are displayed in red, while alerts are colored in yellow. As soon as there is an error message or an alert, the field in the status matrix is also colored accordingly. By clicking on a message in the system message display, the user acknowledges the perception of the message, as a result of which the message is colored in gray. Status matrix 48 is colored in green again only after all messages in the display have been acknowledged and, of course, only if the status of the measuring computer allows this (see Table 2).

What is claimed is:

1. A method for automatically indicating status information via an output device, the status information including at least one of a status of a component of a measuring system, a status of a connection of the measuring system, and a measurement result of the measuring system, the method comprising:
sending measurement packets from a first measuring computer to a second measuring computer over a measurement path with an exponentially adjusted time distribution between the measurement packets so as to determine first status information regarding the measurement path;
assigning the first status information to a first status range of a plurality of fixed status ranges according to at least one first predetermined condition, the first status range being limited by at least one first threshold value;
outputting the assigned first status range; and
automatically updating the first status information at a predetermined time interval.

2. The method as recited in claim 1 further comprising:
assigning second status information to a second status range of the plurality of fixed status ranges according to at least one second predetermined condition, the second status range being limited by at least one second threshold value;
outputting the assigned second status range; and
automatically updating the second status information at the predetermined time interval.

3. The method as recited in claim 1 wherein the measuring system includes at least a portion of a telecommunications network.

4. The method as recited in claim 3 wherein the telecommunications network includes at least one of an internet and an intranet.

5. The method as recited in claim 1 wherein the outputting is performed so as to enable an easy identification of the assigned first status range.

6. The method as recited in claim 1 wherein
the outputting includes displaying the assigned first status range in a graphic using an output device and
further comprising displaying the first status information in the graphic using the output device.

7. The method as recited in claim 6 wherein the graphic includes a matrix.

8. The method as recited in claim 6 wherein the graphic includes a graphical user interface, a first level of the first status range on the graphical user interface having at least one underlying representation level capable of being made visible by activation in the first level.

9. The method as recited in claim 8 wherein the graphical user interface includes a window.

10. The method as recited in claim 8 wherein at least one of the first status information and the first status range is displayed, relative to the first level, in increased detail in the at least one underlying representation level.

11. The method as recited in claim 1 wherein each of the status ranges has a respective different color so as to individualize each respective status range.

12. The method as recited in claim 1 wherein:
the plurality of status ranges includes a second status range; and
the first status range reflects a magnitude of a first measurement result of the sending, and the second status range reflects a value describing a status of a first component of the measuring system.

13. The method as recited in claim 1 wherein: the measuring system includes a first and a second measuring computer and a control computer configured to control the first and second measuring computer; and the first status information is based on at least one of a status of the first measuring computer, a quality of a measurement connection between the first and second measuring computers, a reachability of at least one of the first and second measuring computers by the control computer, a time synchronization of the first and second measuring computers, and a currentness of the status information.

14. The method as recited in claim 7 wherein:
a first component of the measuring system includes a measuring computer;
the first status information relates to a status of the measuring computer; and
the displaying the first status information includes displaying the first status information in an assigned first field in a first column of the matrix.

15. The method as recited in claim 13 wherein
the outputting includes displaying the assigned first status range in a matrix of a graphic using the output device, and further comprising:

displaying the first status information in an assigned first field in a first column of the matrix, the first status information being based on a status of the first measuring computer;

displaying an assigned second status range in the matrix using the output device; and displaying second status information in an assigned second field in the first column of the matrix using the output device, the second status information being based on a status of the second measuring computer.

16. The method as recited in claim 15 wherein the first and second measuring computers are represented in the assigned respective field in the first column of the matrix by a respective identifier including at least one of a name and an IP address.

17. The method as recited in claim 14 wherein the measuring computer is represented in the respective assigned field in the first column of the matrix by a respective identifier including at least one of a name and an IP address.

18. The method as recited in claim 1 wherein a first component of the measuring system includes a measuring computer, and further comprising displaying the first status information in an assigned first field in a first column of a matrix of a graphic, the first status information being based on a status of the measuring computer, the first status information including at least one of a status of a time synchronization of the measuring computer, the reachability of the measuring computer by a control computer, and at least one error message of the measuring system regarding the measuring computer.

19. The method as recited in claim 1 wherein a first component of the measuring system includes a measuring computer, and further comprising displaying the first status information in an assigned first field in a first column of a matrix of a graphic, the first status information being based on a status of the measuring computer, an assignment of the measuring computer to a control computer being indicated in a respective field in a first row of the matrix.

20. The method as recited in claim 1 wherein the measuring system includes a first and a second measuring computer and a control computer, and further comprising: displaying the first status information in an assigned first field in a first column of a matrix of a graphic, the first status information being based on a status of the measuring computer; and indicating, in a second field of the matrix disposed in a second row or a second column of the matrix, a status of a measurement connection between the first and second measuring computers, the first and second measuring computers being indicated in a first column of the matrix and arranged in a predetermined order from top to bottom, a respective assignment of the first and second measuring computers to the control computer being indicated in a first row of the matrix from left to right in the predetermined order.

21. The method as recited in claim 20 wherein:
the second field of the matrix is disposed in the second row of the matrix and indicates a status of a measurement connection in a first direction between the first and second measuring computers; and
a third field of the matrix disposed in a second column of the matrix indicates a status of a measurement connection in a second direction between the first and second measuring computers, the second direction being reverse to the first direction, the third field being disposed symmetrical to the second field about a diagonal of the matrix.

22. The method as recited in claim 21 wherein the status of the measurement connection in at least one of the first and second directions is based on a quality of a measurement connection, a time synchronization of the first and second measuring computers, and a currentness of measurement results.

23. The method as recited in claim 1 wherein
the outputting includes displaying the assigned first status range in a matrix of a graphic using the output device and
further comprising displaying the first status information in the graphic using the output device, the graphic including a graphical user interface, a first level of the first status range on the graphical user interface having a second representation level capable of being made visible by activation in the first level, a second field of the matrix being disposed in a second row or column and including the second representation level showing a status of a first measurement connection in more detail than the first level.

24. The method as recited in claim 23 wherein the second representation level indicates a type of the first measurement connection between first and second measuring computers of the measuring system and a status of at least one measurement parameter determining a quality of the first measurement connection.

25. The method as recited in claim 24 wherein the status of the at least one measurement parameter is based on at least one transmission characteristic in the first measurement connection.

26. The method as recited in claim 25 wherein the at least one transmission characteristic includes at least one of a packet delay, an IP delay variation, and a packet loss.

27. The method as recited in claim 23 wherein the second representation level has a subordinate third representation level showing measurement results in detail over a predetermined period of time.

28. The method as recited in claim 1 wherein
the outputting includes displaying, using an output device, the assigned first status range in a matrix of a graphic including a graphical user interface, and
further comprising displaying the first status information in the matrix using the output device, a first level of the first status range on the graphical user interface having a subordinate second representation level capable of being made visible by activation in the first level, the second representation level displaying system messages.

29. The method as recited in claim 1 wherein the outputting is performed using an output device configured to display and update the status information via a browser.

30. The method as recited in claim 1 further comprising the steps of:
generating a first time stamp for the first measuring computer; and
generating a second time stamp when the first measurement packet is received at the second measuring computer.

* * * * *